(12) United States Patent
Kalhoff

(10) Patent No.: US 8,369,244 B2
(45) Date of Patent: Feb. 5, 2013

(54) METHOD FOR OPERATING AN ETHERNET-CAPABLE FIELD-BUS DEVICE

(75) Inventor: Johannes Kalhoff, Blomberg (DE)

(73) Assignee: Phoenix Contact GmbH & Co. KG (DE)

( * ) Notice: Subject to any disclaimer, the term of this patent is extended or adjusted under 35 U.S.C. 154(b) by 122 days.

(21) Appl. No.: 12/516,669

(22) PCT Filed: Nov. 29, 2007

(86) PCT No.: PCT/EP2007/010339
§ 371 (c)(1),
(2), (4) Date: Oct. 16, 2009

(87) PCT Pub. No.: WO2008/064885
PCT Pub. Date: Jun. 5, 2008

(65) Prior Publication Data
US 2010/0040075 A1    Feb. 18, 2010

(30) Foreign Application Priority Data
Dec. 1, 2006  (DE) .......................... 10 2006 057 133

(51) Int. Cl.
*H04L 12/28* (2006.01)
(52) U.S. Cl. ...................................................... 370/254
(58) Field of Classification Search .................. None
See application file for complete search history.

(56) References Cited

U.S. PATENT DOCUMENTS

| | | | | |
|---|---|---|---|---|
| 5,699,350 A | * | 12/1997 | Kraslavsky | 370/254 |
| 6,009,274 A | * | 12/1999 | Fletcher et al. | 717/173 |
| 6,426,947 B1 | * | 7/2002 | Banker et al. | 370/254 |
| 6,847,614 B2 | * | 1/2005 | Banker et al. | 370/252 |
| 7,093,244 B2 | * | 8/2006 | Lajoie et al. | 717/168 |
| 7,269,661 B2 | * | 9/2007 | Ree et al. | 709/230 |
| 2003/0061412 A1 | | 3/2003 | Van Brero et al. | |

(Continued)

FOREIGN PATENT DOCUMENTS
DE    100 36 686 A1    2/2002

OTHER PUBLICATIONS

Yolaine Cussac, "Application No. PCT/EP2007/010339 International Preliminary Report on Patentability", Jul. 16, 2009, Publisher: PCT, Published in: EP.

(Continued)

*Primary Examiner* — Phirin Sam
*Assistant Examiner* — Faiyazkhan Ghafoerkhan
(74) *Attorney, Agent, or Firm* — Kaplan Breyer Schwarz & Ottesen, LLP

(57) ABSTRACT

The invention relates to a method for operating an Ethernet-capable field-bus device that can be connected to an arbitrary Ethernet-based communications unit by means of which data is transmitted using a predetermined communications protocol stack. For this purpose, a network management channel is initially established between the Ethernet-capable field-bus device (50) and a management device (30) connected to the communications network (20) using an Ethernet-based network management protocol that is installed both in the field-bus device (50) and also in the management device (30). The communications protocol stack installed in the management device (20) is then transmitted using the predetermined network management protocol from the management device (30) to the Ethernet-capable field-bus device (50), where it is stored. In this way, it is guaranteed that useful data can be transmitted using the communications protocol stack from and to the field-bus device (50) via the Ethernet-based communications network (20).

7 Claims, 1 Drawing Sheet

U.S. PATENT DOCUMENTS

| | | | |
|---|---|---|---|
| 2003/0156552 A1* | 8/2003 | Banker et al. | 370/266 |
| 2003/0182440 A1* | 9/2003 | Ree et al. | 709/236 |
| 2004/0133689 A1* | 7/2004 | Vasisht | 709/228 |
| 2004/0267950 A1* | 12/2004 | Praefcke et al. | 709/231 |
| 2005/0149580 A1* | 7/2005 | Hattori et al. | 707/200 |
| 2006/0206218 A1* | 9/2006 | Glanzer et al. | 700/18 |

OTHER PUBLICATIONS

German Search Report and Written Opinion, PCT/EP2007/010339, Dated Aug. 12, 2008, Nathalie Duperron.

International Examination Report, Dated Apr. 16, 2009.

* cited by examiner

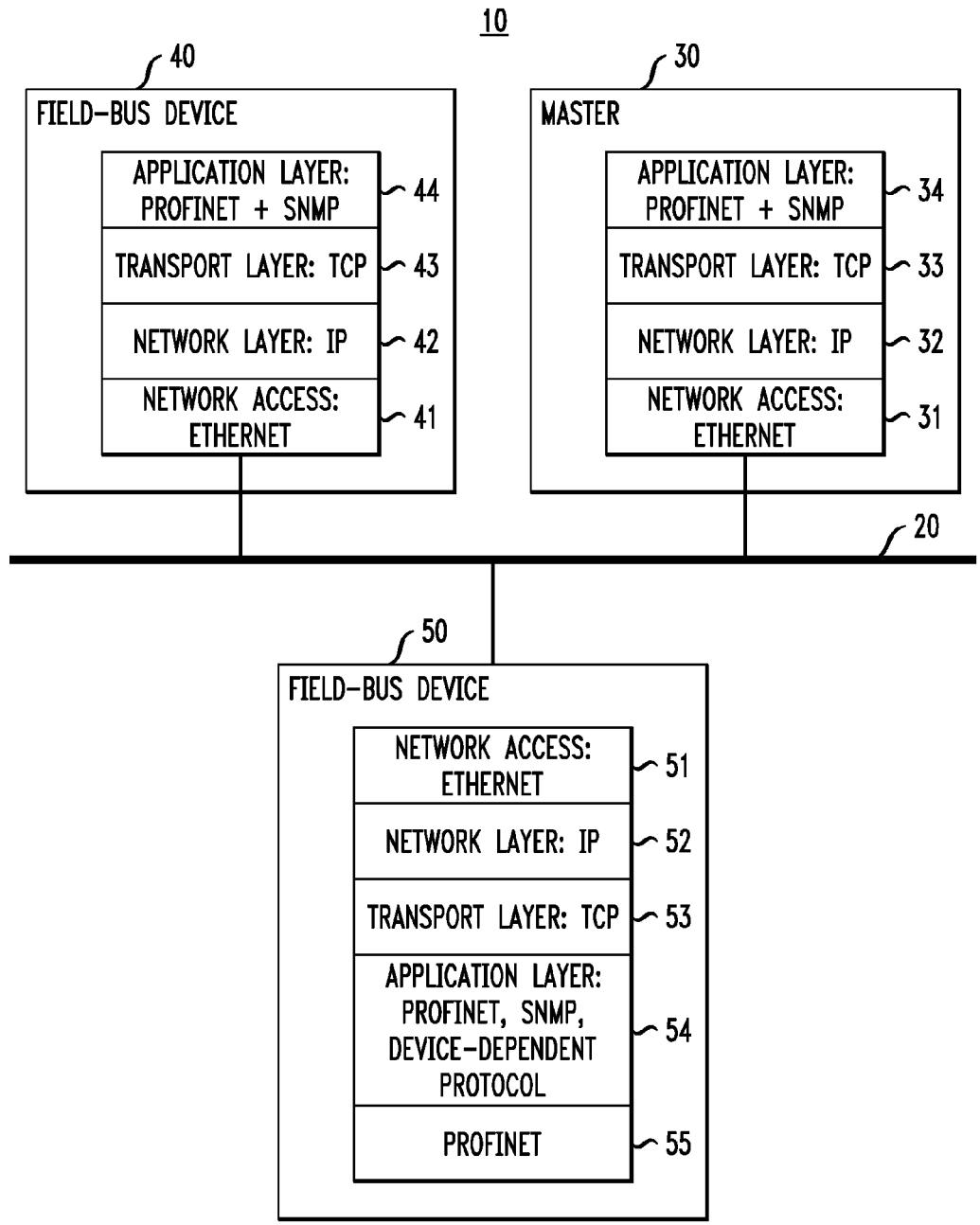

METHOD FOR OPERATING AN ETHERNET-CAPABLE FIELD-BUS DEVICE

FIELD ON THE INVENTION

The invention relates to a method for operating an Ethernet-capable field-bus device that is connected to an Ethernet-based communications network by means of which data can be transmitted using a predetermined communications protocol stack.

BACKGROUND OF THE INVENTION

In automation systems, field-bus devices and higher-level control devices communicate with each other via a network, for example, via Ethernet. For this purpose, as a rule, a standardized communications protocol is used in order to be able to exchange data between field-bus devices and the higher-level control device. Because usually proprietary communications protocols are installed on field-bus devices, before the implementation of an automation system it must be decided which communications protocol and thus which field-bus devices of which manufacturers are to be used.

SUMMARY OF THE INVENTION

The present invention is based on the problem of disclosing a method with which Ethernet-based communications systems can be built flexibly and at low expense. In particular, the problem of the present invention is to be able to operate manufacturer-independent field-bus devices on different Ethernet-based communications systems.

A core concept of the invention is to be seen in that Ethernet-capable field-bus devices are to be automatically adapted to an arbitrary Ethernet-based communications system from a central location, so that field-bus devices of different manufacturers can exchange useful data with each other and/or with a higher-level control device via an Ethernet-based communications network.

The technical problem named above is solved by a method for operating an Ethernet-capable field-bus device that is connected to an Ethernet-based communications network by means of which data is transmitted using a predetermined communications protocol stack.

Initially, a network management channel is established between the Ethernet-capable field-bus device and a management device connected to the communications network. The network management protocol can be the Simple Network Management Protocol, also called SNMP for short. This Ethernet-based network management protocol is installed both in the field-bus device and also in the management device. Now, to be able to transmit user data, i.e. payload, the communications protocol stack is transmitted using the predetermined network management protocol from the management device to the Ethernet-capable field-bus device. The predetermined communications protocol stack is stored in the Ethernet-capable field-bus device. A control device implemented in the field-bus device can then control a transmission of user data via the Ethernet-based communications network using the communications protocol stack.

It shall be noted at this point that the communications protocol stack can involve an Ethernet protocol stack, for example, Profinet, which contains the Ethernet/IP stack, TCP/IP protocols, or the AppleTalk protocol stack.

Advantageous refinements are the subject matter of the subordinate claims.

Because the Ethernet-based field-bus device initially cannot be incorporated into the communications network due to the lack of the predetermined communications protocol stack, after the connection to the communications network, the Ethernet-based field-bus device transmits a request signal via the network management channel to the management device in order to request the transmission of the predetermined communications protocol stack. The management device then transmits, in response to the request signal, the predetermined communications protocol stack to the Ethernet-based field-bus device.

In order to save channel capacity in the communications network, the network management channel is released again before beginning a transmission of user data.

In order to be able to transmit the communications protocol stack from the management device to the field-bus device, this stack is divided into frames or blocks according to the network management protocol and transmitted in IP packets to the Ethernet-capable field-bus device.

BRIEF DESCRIPTION OF THE DRAWING

The invention will be explained in greater detail below with reference to an embodiment in connection with FIG. 1, which depicts automation system 10.

DETAILED DESCRIPTION

In FIG. 1, an example automation system 10 is shown that has an Ethernet-based communications network 20 to which is connected a higher-level control device 30, also called master below. In the master 30, a network management functionality, for example, SNMP, are and also an Ethernet-compatible, physical interface 31 implemented in the application layer 34 by means of which they are connected to the communications network 20. The higher-level control device 30 can transmit and receive, among other things, configuration and parameterization data via the SNMP protocol by means of the communications network 20. In addition, in the application layer 34 of the master 30 in the present example, a predetermined communications protocol stack is installed by means of which user data or payload can be transmitted and received via the communications network 20. In the present example, the Profinet protocol has been installed in the master 30 as the communications protocol stack. Furthermore, in the master 30 the TCP/IP protocol is installed in a known way in the transport layer 33 or the network layer 32.

Furthermore, a field-bus device 40 is connected to the communications network 20, wherein this field-bus device is connected via an Ethernet-compatible physical interface 41 to the communications network 20. Similar to the higher-level control device 30, the field-bus device 40 could have an Ethernet-compatible data-security layer. As application software, Profinet is stored as the communications protocol stack and the SNMP protocol is stored as the network management protocol in the field-bus device 40.

The control of the data exchange via the communications network takes place both in the higher-level control device 30 and also in the field-bus device 40 via the TCP/IP protocol. User data or application data are exchanged between the field-bus device 40 and the higher-level control device 30 using the Profinet protocol.

Now let it be assumed that another field-bus device that is designated by reference numeral 50 is connected to the communications network 20. The field-bus device 50 is similarly connected via an Ethernet-compatible physical interface 51 to the communications network 20. In turn, the TCP/IP protocol is used as the transport protocol that is arranged in the transport layer 53 and in the network layer 52. In the application layer 54 of the field-bus device 50, the SNMP protocol and also a device-dependent or manufacturer-dependent communications protocol that is not Profinet are installed as the network management protocol. Consequently, the field-bus device 50 can neither log on to the higher-level control device 30 nor be identified by this control device as a new field-bus device to be added.

In order to be able to incorporate the field-bus device 50 into the automation system 10, the field-bus device 50 also requires the Profinet protocol. Consequently, the field-bus device 50 first generates a request signal that is transmitted to the higher-level control device 30 under the control of the SNMP protocol used for the configuration and parameterization of Ethernet-based devices. Together with the request signal, an identifier of the higher-level control device 30 and an identifier of the field-bus device 50 are transmitted to the control device 50. The request signal is indeed also received by the field-bus device 40; however, only the higher-level control device 30 is constructed such that it interprets the request signal as a request to transmit the Profinet protocol to the field-bus device 50.

The higher-level control device 30 packs the Profinet protocol to be transmitted into frames that are generated according to the SNMP protocol and that are transmitted, in turn, in IP packets via the communications network 20 to the field-bus device 50. The Profinet protocol received in the IP packets is transmitted to the application layer 54 in which the Profinet protocol is re-created under the control of the SNMP protocol and is stored in a special memory 55 as a communications protocol. After receiving the Profinet protocol, the field-bus device 50 could transmit, using the SNMP protocol, an acknowledgment message concerning the receipt and installation of the Profinet protocol to the higher-level control device 30. Alternatively or additionally, the field-bus device 50 could be implemented such that it generates, under the control of the Profinet protocol, an acknowledgment message and transmits this message to the higher-level control device 30. The higher-level control device 30 is constructed such that, with the correct receipt of the acknowledgment message, it can recognize that the Profinet protocol has been properly installed in the field-bus device 50.

According to one special embodiment, the higher-level control device 30 can inform the field-bus device 40 that another field-bus device 50 has been incorporated into the automation system 10. A communications operation can now take place using the Profinet protocol between all of the subscribers connected to the communications network 20.

According to one advantageous embodiment, the Profinet protocol is transmitted from the higher-level control device 30 to the new field-bus device to be added during the initialization phase of this new field-bus device 50 to be added. For this purpose, a network management channel is initially established between the field-bus device 50 and the higher-level control device 30 under the control of the SNMP protocol. The request signal transmitted from the field-bus device 50 and also the Profinet protocol transmitted from the higher-level control device are then transmitted via the established network management channel under the control of the SNMP protocol. At the end of the initialization phase, the network management channel is again released and the actual useful data communications can begin. The network management channel that can also act as a parameterization channel or configuration channel could also be used simultaneously for the transmission of useful data.

The invention claimed is:

1. A method for operating an Ethernet-capable field-bus device (50) within an automation system, wherein this field-bus device is connected to an Ethernet-based communications network (20) by means of which payload data is transmitted using a predetermined communications protocol stack with the following processing steps:
   a) establishing a network management channel between the Ethernet-capable field-bus device (50) and a management device (30) connected to the communications network (20) using an Ethernet-based network management protocol that is installed both in the field-bus device (50) and also in the management device (30),
   b) transmitting the predetermined communications protocol stack using the Ethernet-based network management protocol from the management device (30) to the Ethernet-capable field-bus device (50),
   c) storing and installing the predetermined communications protocol stack in the Ethernet-capable field-bus device (50, 55), wherein the predetermined communications protocol stack controls a transmission of payload data via the Ethernet-based communications network (20), and wherein said transmission of payload data via the Ethernet-based communications network (20) is not enabled prior to performing steps b) and c).

2. The method according to claim 1, characterized in that the Ethernet-based field-bus device (50) transmits a request signal for transmitting the predetermined communications protocol stack via the network management channel of the communications network to the management device (30) and that the management device (30) transmits, in response to the request signal, the predetermined communications protocol stack to the Ethernet-based field-bus device (50).

3. The method according to claim 1, characterized in that the network management channel is released before beginning a transmission of payload data.

4. The method according to claim 1, characterized in that the predetermined communications protocol stack is an Ethernet protocol stack that contains an Ethernet/Internet Protocol (IP) stack, Transmission Control Protocol/Internet Protocol (TCP/IP) protocols, or an AppleTalk protocol stack.

5. The method according to claim 1, characterized in that a Simple Network Management Protocol (SNMP) is used as the network management protocol.

6. The method according to claim 1, characterized in that the predetermined communications protocol stack is divided into frames according to the network management protocol and is transmitted to the Ethernet-capable field-bus device (50).

7. The method according to claim 1 characterized in that the communications network (20) contains an Ethernet-based field bus.

* * * * *

UNITED STATES PATENT AND TRADEMARK OFFICE
CERTIFICATE OF CORRECTION

PATENT NO.      : 8,369,244 B2
APPLICATION NO. : 12/516669
DATED           : February 5, 2013
INVENTOR(S)     : Johannes Kalhoff It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 438 days.

Signed and Sealed this
First Day of September, 2015

Michelle K. Lee
*Director of the United States Patent and Trademark Office*